(12) United States Patent
Sedeffow

(10) Patent No.: US 8,724,691 B2
(45) Date of Patent: May 13, 2014

(54) TRANSCODING VIDEO DATA

(75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 481 days.

(21) Appl. No.: 12/761,169

(22) Filed: Apr. 15, 2010

(65) Prior Publication Data

US 2010/0266009 A1 Oct. 21, 2010

(30) Foreign Application Priority Data

Apr. 18, 2009 (GB) .................... 0906721.6

(51) Int. Cl.
*H04N 21/23* (2011.01)
*H04N 1/00* (2006.01)
*H04N 7/26* (2006.01)

(52) U.S. Cl.
CPC ................. *H04N 21/23* (2013.01); *H04N 1/00* (2013.01); *H04N 19/00* (2013.01); *H04N 1/0083* (2013.01)
USPC ...................................... 375/240

(58) Field of Classification Search
CPC ......... H04N 11/02; H04N 7/26; H04N 19/00; H04N 21/23; H04L 12/18
See application file for complete search history.

(56) References Cited

U.S. PATENT DOCUMENTS

| 5,734,822 | A * | 3/1998 | Houha et al. .................. 717/167 |
| 5,930,473 | A * | 7/1999 | Teng et al. .................... 709/204 |
| 6,785,704 | B1 * | 8/2004 | McCanne ..................... 718/105 |
| 7,224,890 | B2 * | 5/2007 | Kato .............................. 386/241 |
| 7,330,509 | B2 * | 2/2008 | Lu et al. ................... 375/240.03 |
| 7,496,283 | B2 * | 2/2009 | Evans et al. ................... 386/343 |
| 8,073,275 | B2 * | 12/2011 | Shatz et al. .................... 382/239 |
| 8,180,920 | B2 * | 5/2012 | Mills et al. ..................... 709/238 |
| 8,588,296 | B2 * | 11/2013 | Yang et al. ................ 375/240.03 |
| 2006/0126948 | A1 | 6/2006 | Fukuhara et al. |
| 2008/0037880 | A1 * | 2/2008 | Lai ................................ 382/232 |
| 2008/0084925 | A1 * | 4/2008 | Rozen et al. ............. 375/240.01 |
| 2008/0112483 | A1 * | 5/2008 | Lu et al. ................... 375/240.03 |
| 2008/0120676 | A1 * | 5/2008 | Morad et al. .................. 725/127 |
| 2008/0192820 | A1 * | 8/2008 | Brooks et al. ............ 375/240.02 |
| 2008/0273591 | A1 * | 11/2008 | Brooks et al. ............ 375/240.01 |

(Continued)

FOREIGN PATENT DOCUMENTS

| WO | 2007/053957 A1 | 5/2007 | |
| WO | WO 2007/053957 | * 5/2007 | ............. H04L 12/18 |

OTHER PUBLICATIONS

Haskell et al, "Digital Video: An Introduction to MPEG-2", Chapman and Hall, 1997, pp. 33, 35, 230, 232-233.*

*Primary Examiner* — Jay Patel
*Assistant Examiner* — Reza Aghevli
(74) *Attorney, Agent, or Firm* — Richard M. Goldberg

(57) ABSTRACT

Video data is transcoded on the fly to produce a progressive download viewed while the data is being received while streaming and/or may be downloaded and played later. An analyzer analyzes a portion of an input video data file to determine coded characteristics of encoded input video and determines an expected data volume. A generator generates a file header for output video data that includes an indication of the expected volume thereof. A transcoder transcodes the input video data to produce encoded output video data. The output interface supplies the encoded output video data with the file header as a stream to a receiving device. In a first embodiment, the expected volume of data in the header is overestimated and blank video chunks added. In an alternative embodiment, the expected data of volume is underestimated and compression parameters are modified during the transcoding process.

16 Claims, 12 Drawing Sheets

(56) References Cited

U.S. PATENT DOCUMENTS

| | | | |
|---|---|---|---|
| 2009/0003432 A1* | 1/2009 | Liu et al. | 375/240.01 |
| 2009/0016433 A1* | 1/2009 | Henocq et al. | 375/240.01 |
| 2009/0028428 A1* | 1/2009 | Dovstam et al. | 382/166 |
| 2009/0060033 A1* | 3/2009 | Kimmich et al. | 375/240.02 |
| 2009/0067489 A1* | 3/2009 | Jacobs | 375/240.01 |
| 2009/0086814 A1* | 4/2009 | Leontaris et al. | 375/240.02 |
| 2009/0086816 A1* | 4/2009 | Leontaris et al. | 375/240.03 |
| 2010/0061448 A1* | 3/2010 | Zhou et al. | 375/240.03 |
| 2010/0266009 A1* | 10/2010 | Sedeffow | 375/240.02 |

\* cited by examiner

TRANSCODING VIDEO DATA

CROSS REFERENCE TO RELATED APPLICATIONS

This application claims priority from United Kingdom Patent Application No. 09 06 721.6, filed 18 Apr. 2009, the whole contents of which are incorporated herein by reference in their entirety.

BACKGROUND OF THE INVENTION

1. Field of the Invention

The present invention relates to transcoding a first video data file to produce a second video data file for downloading that can be viewed progressively as the file is being downloaded.

2. Description of the Related Art

Methods for the transcoding of video data files to produce a new video data file in a different video format are known. It is also known to stream video data so that the data may be viewed progressively as it is being received at a mobile device for example. However, it is also known that some mobile devices are not configured to display streamed data but are equipped to display a file after it has been downloaded. It is therefore desirable to download a file to a device for later viewing while at the same time allowing the device to view the file progressively as it is being received. However, a problem exists when transcoding data of this type in that it is necessary to provide information identifying the size of a downloaded file. This creates a problem if the file is being transcoded on the fly because the total size of the resulting file will not be known until the resulting file has been completely transcoded.

Transcoding operations are regularly performed when video material held at a remote server is accessible over the Internet. However, the stored material is primarily configured for being displayed on static workstations or television receivers etc. A transcoding operation is therefore required if the material is to be displayed on a mobile device, such as a mobile telephone. Thus, it is necessary to identify the original coding parameters, identify the coding parameters required by a receiver and then perform a transcoding operation to convert from the original type of coding to the recipient's type of coding. If the recipient is looking to download a file (for viewing later) a delay will be incurred before the recipient is in a position to view the file. Thus, a preferred approach would be to stream the file so that the recipient can view the file while the data is being received, while at the same time retaining a downloaded version of the file. In this way, the download delay is not so noticeable.

Further delays occur during the transcoding process. Transcoding delays may be minimised by performing a technique of rapid transcoding as described in the present applicant's co-pending European Patent Application No 08 253 317.5 filed 10 Oct. 2008 or in the applicant's co-pending U.S. patent application Ser. No. 12/330,782 filed 9 Dec. 2008. However, such an approach does require dedicated hardware.

An alternative approach to rapid transcoding would be to perform the transcoding operation in a conventional serial fashion but to allow the video material to be sent to the recipient on the fly while the transcoding operation is being performed. In this way, assuming the recipient can view streamed material, both the transcoding delay and the download delay are avoided and the display of video at the recipient's equipment appears almost instantaneous. However, if in addition to viewing the material as a stream the data file is also downloaded, it is necessary for the receiving equipment to be made aware as to the total size of the downloaded file. Should this identification of size be incorrect, failures could occur at the recipient's equipment, possibly due to the equipment awaiting a data chunk that does not exist. However, if the transcoding process is still ongoing while material is being received, the transcoder would not be aware as to the total size of the file therefore it could not provide the recipient with file size information. A problem therefore exists in terms of providing a file as a stream, so that it may be viewed as the material is received, while at the same time making the file compatible with a downloaded file, so that the file may be viewed after it has been downloaded and stored.

BRIEF SUMMARY OF THE INVENTION

According to an aspect of the present invention, there is provided a method of transcoding encoded input video data to produce encoded output video data, comprising the steps of: locating an input video data file; analysing a portion of said input video data file to determine coding characteristics of encoded input video data contained within said input video data file; determining an expected data volume by estimating the amount of data that would be present in an output video data file created by transcoding said input video data file; creating a file header for an output video data file that includes an indication of said expected data volume; receiving the encoded input video data located by said locating step; transcoding received encoded input video data to produce encoded output video data; and supplying said encoded output video data with said file header as a stream to a receiving device, such that said receiving device may view the output video data as it is received as a stream and/or said receiving device may store the output video data with the file header as a downloaded file.

In a preferred embodiment, the step of supplying the encoded output video data includes the step of monitoring the volume of output data being produced by the transcoding operation to ensure that the volume of output data produced is consistent with the expected data volume.

According to a second aspect of the present invention, there is provided an apparatus for transcoding encoded input video data to produce encoded output video data, comprising: a locator for locating an input video data file; an analyser for analysing a portion of said input video data file to determine coding characteristics of encoded input video data contained within said input video data file, and for determining an expected data volume by estimating the amount of data that would be present in an output video data file created by transcoding said input video data file; a generator for generating a file header for an output video data file that includes an indication of the expected data volume of said output video data file; an input interface for receiving the input video data located by said locator; a transcoder for transcoding the input video data to produce encoded output video data; and an output interface for supplying the encoded output video data with said file header as a stream to a receiving device, such that said receiving device may view the output video data as it is received as a stream and/or said receiving device may store the output video data with the file header as a downloaded file.

DETAILED DESCRIPTION OF THE PREFERRED EMBODIMENTS

FIG. 1

Figure 1:
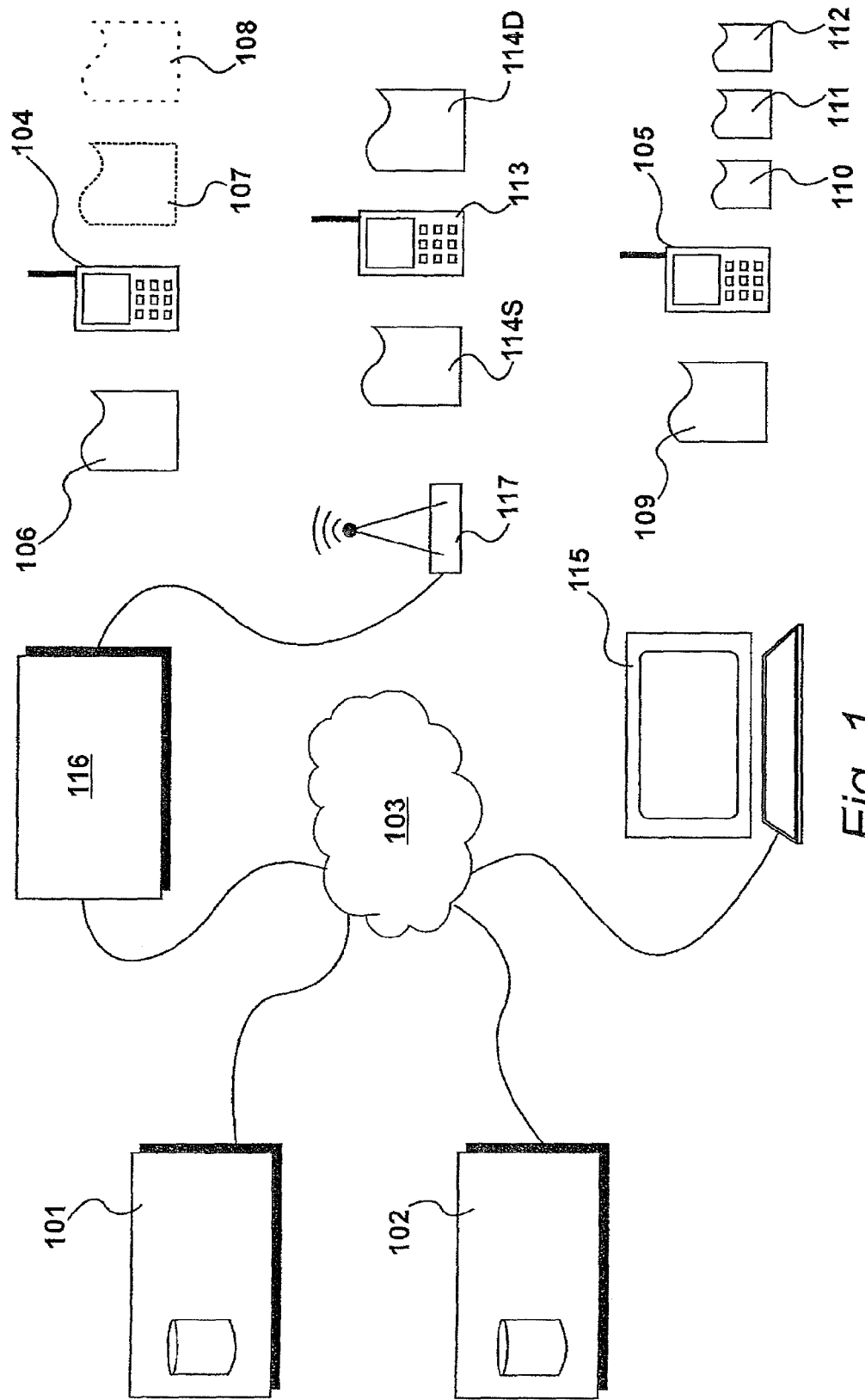
FIG. 1 shows an environment in which the transcoding of encoded input video data is performed.

An environment in which the transcoding of encoded input video data is performed is illustrated in FIG. 1. Input video data files are stored at a first location 101 and at a second location 102, both of which are connected to the Internet 103. For the purposes of illustration, it may be assumed that the files available from location 101 are available free of charge, whereas files downloadable from location 102 require a subscription or a payment per file. Thus, the files at location 101 may be derived from material provided by individuals whereas the files downloadable from location 102 may represent commercially available movies.

A first user has a mobile device 104 and a second user has a mobile device 105. Mobile device 104 is configured to receive video files 106 in the form of a stream such that after the material has been viewed (while being streamed) the material is lost, as indicated by ghosted files 107, 108. Thus, if the user using device 104 wishes to view the video material again, it is necessary for the material to be selected again and streamed again.

By contrast, mobile device 105 has requested the downloading of a video file 109. However, device 105 is not provided with streaming capabilities therefore the file 109 is downloaded as a whole and stored, whereafter the stored file may be viewed. Thus, for the purposes of illustration, mobile device 105 has stored files 110, 111 and 112. Thus, having downloaded a file, video data may be viewed as many times as desired by the user until the stored file is deleted. In an alternative embodiment, restrictions may be placed on the user in terms of the number of times the file may be used, as described in the applicant's co-pending United Kingdom Patent Application No. 07 09 030.1 filed 10 May 2007 (and U.S. patent application Ser. No. 12/113,403 filed 1 May 2008).

For the purposes of this illustration, it is assumed that mobile device 113 is capable of displaying video material while said material is being streamed and device 113 is also capable of downloading a file such that the file is stored for subsequent viewing. Consequently, as illustrated, mobile device 113 views video file 114S in the form of a stream. However, having received the stream, the video file is stored as a downloaded file 114D for subsequent viewing.

The video material stored at locations 101 and 102 is usually stored in a single format that is primarily adopted for display at fixed devices, such as device 115, taking the form of a desktop computer. Thus, in order for a video file to be viewed at location 115 from, say, source 101, a browser at 115 issues a request to server 101 resulting in the file being served via the Internet 103 for immediate display or storage at device 115.

For display (as a stream or as a download) by mobile devices 104, 113, 105 it is necessary for a transcoding operation to be performed. In this example, the transcoding operation is performed by a transcoding station 116 which is working in co-operation with a mobile network service provider. Mobile devices 104, 113, 105 communicate with radio base stations, such as base station 117, and base station 117 communicates with the transcoding station 116. Requests are made by the mobile devices to locate video material and searching mechanisms may be provided by the transcoding station and/or the mobile network service provider; possibly as detailed in the applicant's co-pending European patent application 08 252 659 filed 9 Aug. 2008. It is then necessary for the transcoding station 116 to locate the appropriate file, from server 101 or server 102 etc, receive the file, perform a transcoding operation and then transmit the file to the requesting mobile device.

FIG. 2

Figure 2:
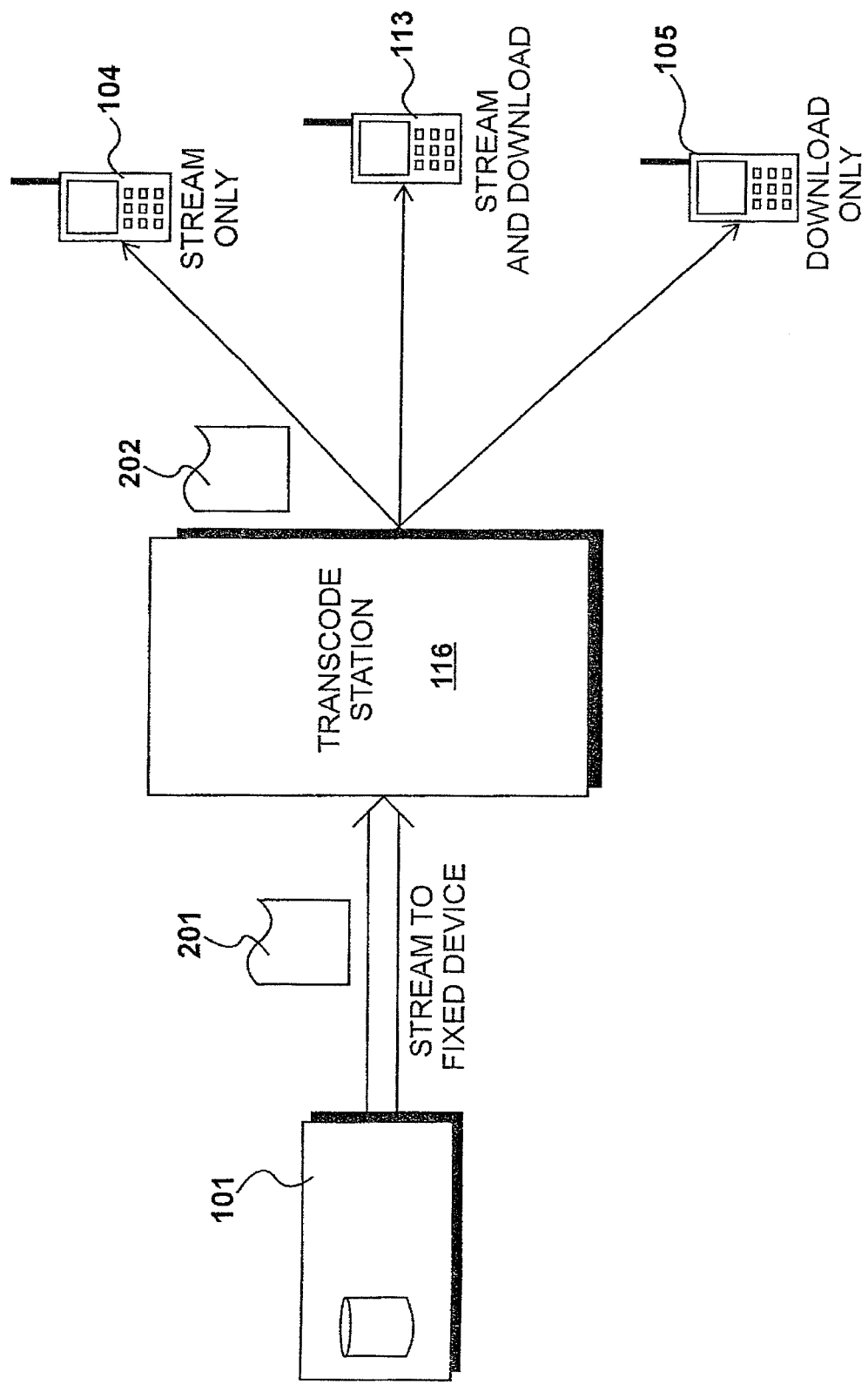
FIG. 2 shows a schematic representation of the operations performed within the environment of FIG. 1.

A schematic representation of the operations performed within the environment of FIG. 1 is illustrated in FIG. 2. For the purposes of this illustration, it is assumed that a video file has been selected from source 101 and that this file may be supplied to mobile devices 104, 113 or 105. For the purposes of illustration, it is assumed that the same transcoding operation is required for each of the mobile devices; that is to say, each mobile device is relying upon a substantially similar CODEC (coder/decoder) for viewing the video material. Thus, the same video file could be streamed to each of the three users.

However, as previously described, receiving device 104 is only capable of viewing a stream and does not download files, device 113 views a stream and downloads the file and device 105 is not capable of viewing streamed material and only downloads video files. In this environment, transcoding station 116 is aware of the type of transcoder required in order for the material to be viewed. However, the transcoder 116 is not concerned with viewing capabilities (stream or download) and it must be assumed that having transcoded a file, the transcoded file may be viewed while being streamed (in order to avoid download delay) but at the same time the material must also be capable of being handled like a download if streaming capabilities are not available at the receiving equipment. This creates a problem in that conventional transcoding equipment would not be capable of identifying the number of data chunks present in the output transcoded data material given that this information would not be available until all of the material has been transcoded.

For example, in some transcoding operations the degree of data compression deployed could be quite severe, therefore the amount of data present in an output file could be substantially less than the data volume present in the input file. Thus, merely considering the amount of data present in the input file would not provide a mechanism for accurately defining the number of chunks of data present in the output file. Furthermore, if this estimate is incorrect by even one chunk, failure could occur at the receiving device.

FIG. 3

Figure 3:
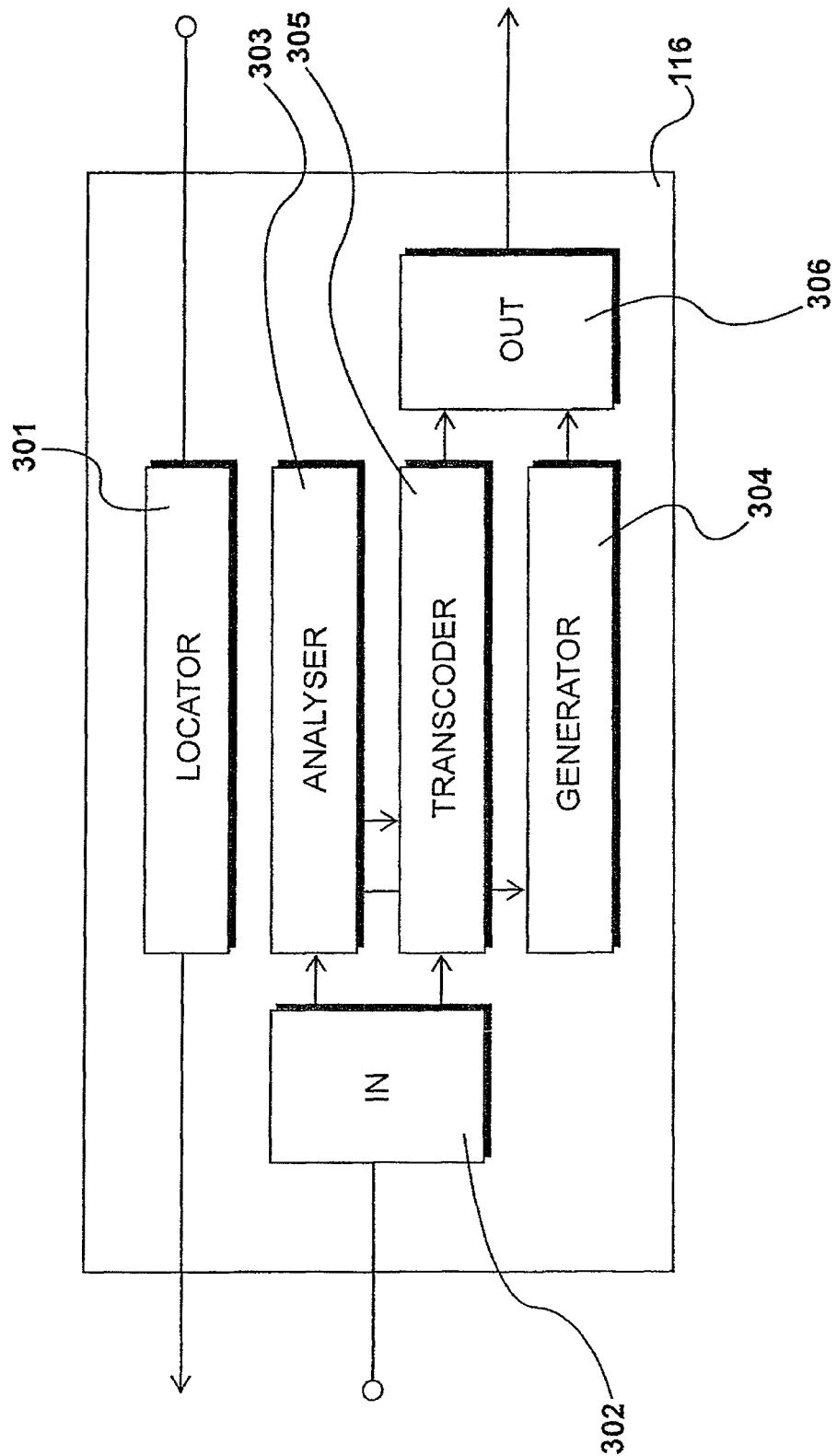
FIG. 3 shows an example of transcoding apparatus.

An example of transcoding apparatus embodying an aspect of the present invention is illustrated in FIG. 3. A video asset is identified at a receiver and the transcoding station 116 is then required to locate material for the asset via the Internet 103. A locator 301 locates the material from the Internet so that the stored material may be transcoded and provided to the recipient.

Having received some of the source material via an input interface 302, an analyser 303 analyses a portion of the input video data file to determine coding characteristics of the encoded input video data contained within the input video data file.

A generator 304 generates a header for an output file and a transcoder 305 performs the decoding and re-coding operation of the input video data to produce output video data. Thus, the generator 304 receives an estimate of the amount of output video data present in the transcoded material, from the analyser 303. This allows the generator 304 to generate a header that includes an indication of the expected volume of data chunks present in the output video data file. In a preferred embodiment, the analyser 303 provides a best estimate of the number of chunks present in the output data and the generator 304 modifies this best estimate to provide an expectation which is monitored to ensure that the actual number of data chunks is consistent with this expectation.

Having generated the header, which is supplied to an output interface 306 from the generator 304, the transcoder 305 generates the output video data by receiving input video data from the input interface 302. In this way, it is possible for the output interface 306 to supply the encoded output video data with the file header as a stream to the receiving device. The receiving device may then view the output video data as it is received as a stream and/or the receiving device may store the output video data with the file header as a downloaded file. However, in order to achieve this, the number of data chunks transmitted must be consistent with the number of chunks identified in the header. In this way, the data may be successfully streamed and the data may be successfully stored as a downloaded file because the number of chunks of data identified in the header will be consistent with the number of chunks present in the file as a whole.

FIG. 4

Figure 4:
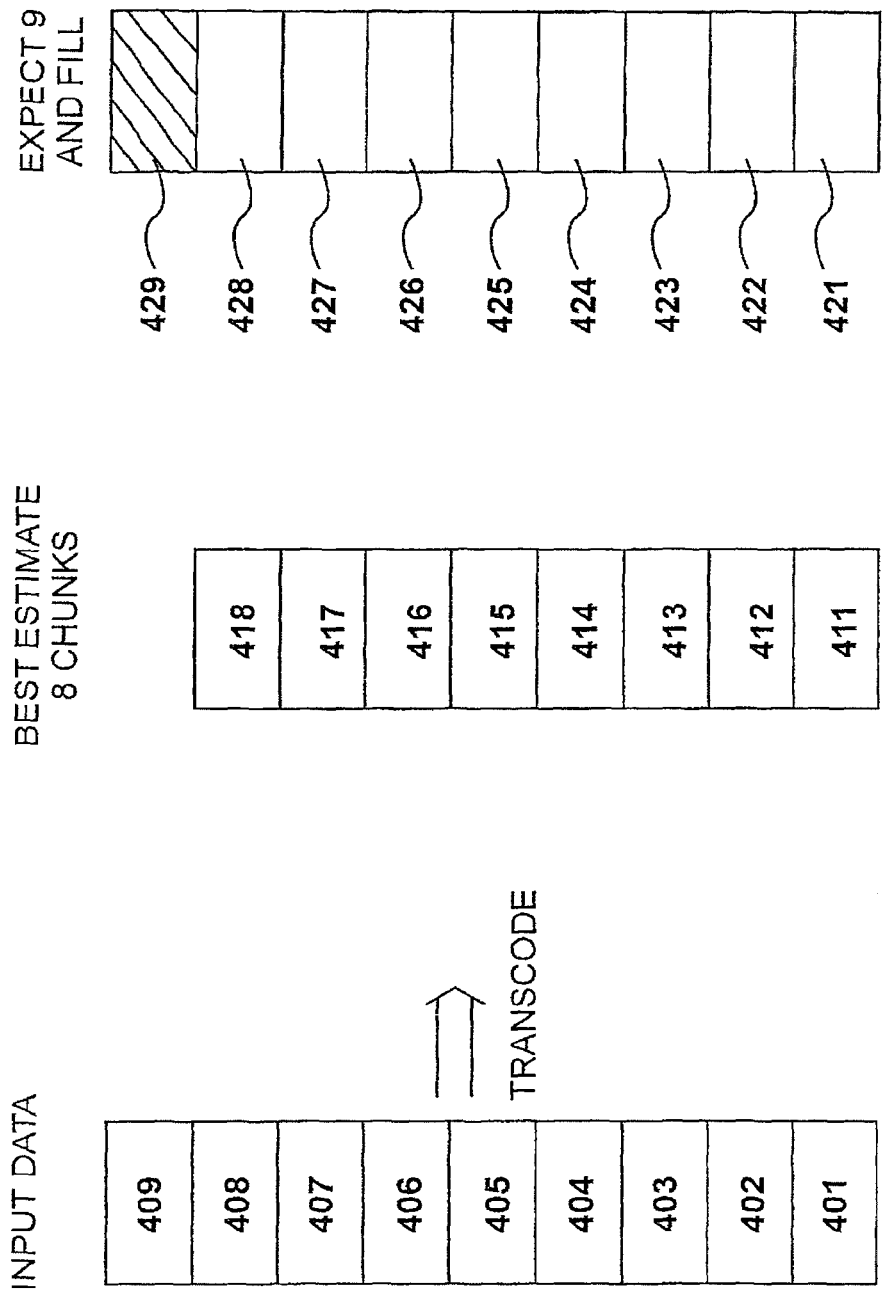
FIG. 4 illustrates a transcoding process.

In a preferred embodiment, the transcoding station includes a monitoring device for monitoring the volume of output video data supplied as a stream to the receiving device so as to check that the volume of output data produced is consistent with the expected output data volume as specified in the header. In a first preferred embodiment, the indication of the expected data volume produced by the generator 304 is made larger than a best estimate of output data volume and the transcoder produces additional output video data to ensure consistency. This approach is illustrated in FIG. 4.

For the purposes of illustration, the input data is considered as being made up of nine chunks of video material labelled 401 to 409. The number of data chunks present would be identified in a header and the header would also identify the number of tracks present, which would typically be one track of video data plus one or two tracks of audio data.

The input data 401 to 409 has been analysed by analyser 303 and therefore the type of transcoding required is known. Given this knowledge of transcoding type and the volume of input data (nine chunks) an estimate can be made of the number of chunks present in a transcoded output video data file. Thus, in this example, it has been estimated that eight data chunks 411 to 418 will be required in the output data file.

In order to produce these estimates, functions could be developed for each transcoder type or empirical results could be read from a look up table. However, it is appreciated that these are estimates and therefore the estimate could be wrong, particularly for large video clips. Thus, for the purposes of this illustration, although eight chunks have been estimated, it is possible that after the transcoding operation has taken place, a total of seven chunks or a total of nine chunks may be required. Thus, if a generated header identified eight chunks and only seven chunks were provided, a CODEC at the receiver would enter a wait state awaiting the arrival of video data in the last non-existent chunk. Similarly, if more than eight chunks of data are produced, the final portion of the video material will be lost and a viewer may end up paying for material that they do not receive.

In a preferred embodiment as illustrated in FIG. 4, a best estimate is calculated but then the size of this estimate is increased to produce an expectation of higher value. Thus, in the example of FIG. 4, the best estimate of eight chunks 411 to 418 has been converted to an expectation of nine chunks, referenced 421 to 429.

It is likely that the best estimate will be correct and therefore video data will be transcoded for chunks 421 to 428. Under these circumstances chunk 429 is still included but it is filled with blank video material or a message produced by the network operator. However, should the estimate be wrong and should more than eight chunks of data be required, provision has been made and this extra video data can be written to chunk 429, thereby ensuring that data is not lost.

Similarly, if the estimate is higher than the actual resulting amount of video data produced, this does not create a problem because the additional space is filled with blanks. In either event, the recipient sees the whole of the video material and a receiving device will not experience any difficulties when the material is being viewed from a stream created on the fly or when the material is being viewed from a previously downloaded file.

FIG. 5

Figure 5:
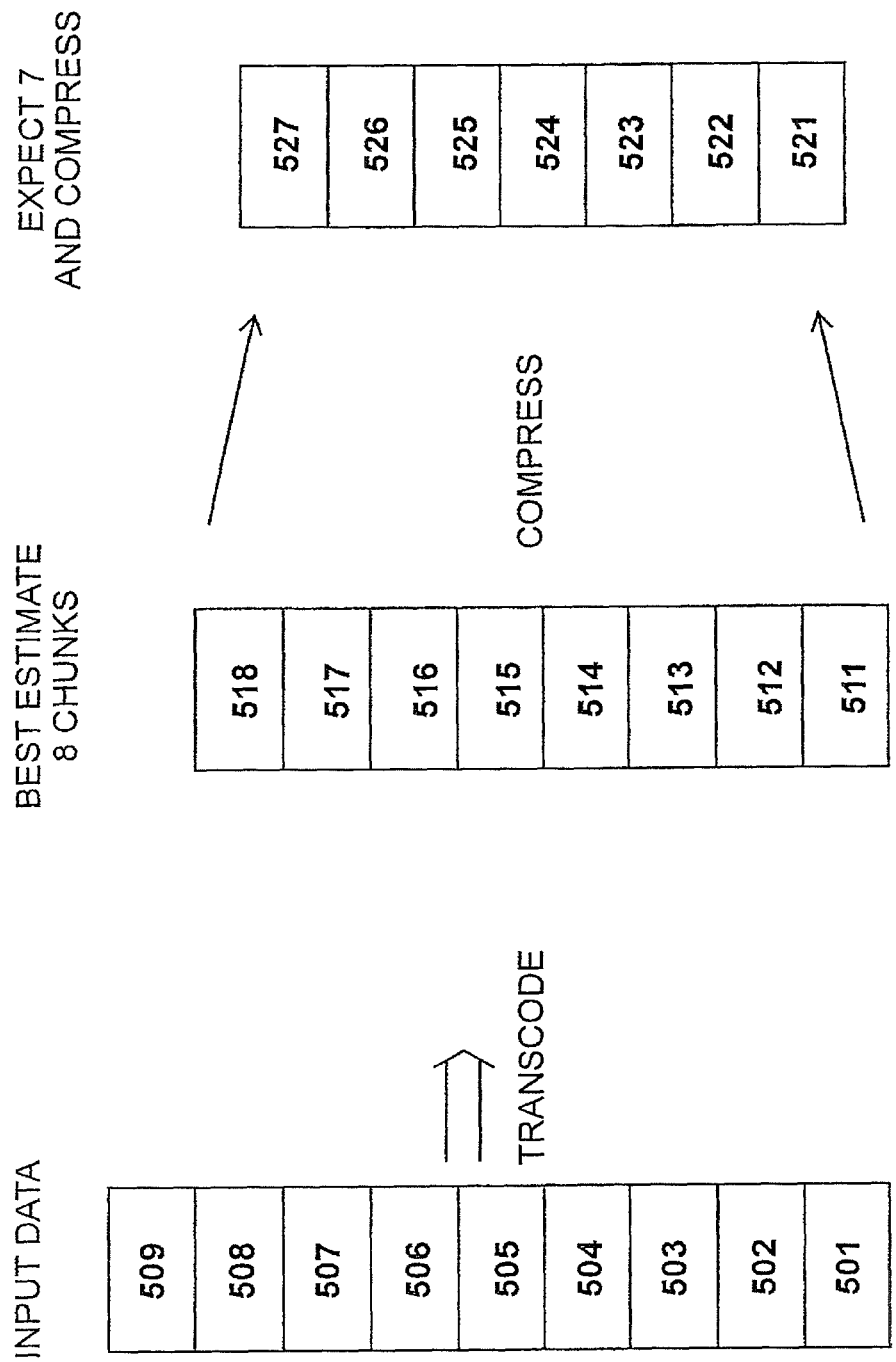
FIG. 5 shows an alternative process.

In an alternative embodiment, the transcoding station 116 again generates a header (from generator 304) that provides an indication of the expected data volume. This expected data volume is again derived from a best estimate, produced by analyser 303, but on this occasion the expectation has been made smaller than the best estimate. This approach is illustrated in FIG. 5. On this occasion nine input chunks of video data are present labelled 501 to 509. The analyser 303 makes a best estimate to the effect that the output video data should include a total of eight chunks, labelled 511 to 518. However, in this embodiment, the header does not identify eight chunks but as an alternative it identifies an expectation of seven chunks 521 to 527.

The expectation of data chunks has therefore been compressed to seven from a best estimate of eight. This compression is achieved by controlling the degree of compression achieved during the encoding portion of the transcoding process. This may introduce a degree of information loss but the generation of data is monitored so as to optimise the degree of compression provided by the transcoding operation so as to ensure that optimum use is made of the expectation defined in the file header. Thus, if during the transcoding process it appears that a greater number of chunks will be required over the expectation, the compression level is increased so as to reduce the output data volume and thereby bring the actual number of video chunks generated to within the figure defined as the expectation in the header. Similarly, if the data volume starts to reduce well below the expectation, the degree of compression may be relaxed thereby increasing the output data volume. Thus, as transcoding is performed, modifications are made to the degree of compression applied, thereby ensuring that the total number of data chunks present in the output video stream is consistent with the expectation defined in the header.

FIG. 6

It is possible for the transcoding station 116 to be computer controlled and for operations of a preferred embodiment to be performed predominantly in software.

Figure 6:
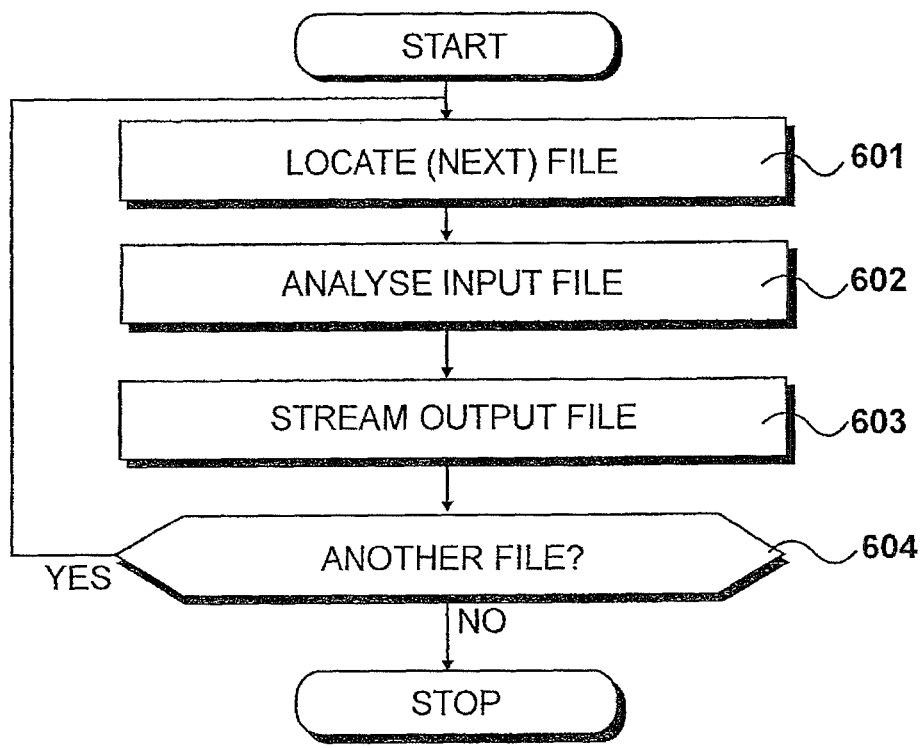
FIG. 6 illustrates operations performed by a transcoding process.

In order to achieve an aspect of the present invention, the transcoding station is required to perform a method as set out in FIG. 6. The method effectively transcodes encoded input video data to produce encoded output video data.

At step 601 a video file is located, via the Internet 103 for example, so that the data may be downloaded from a source, such as video source 101 or source 102.

At step 602 a portion of the stored video material is analysed to determine coding characteristics of encoded input video data contained within an input video data file. The analysis of the input video data allows transcoding parameters to be determined, such that the stored video may be decoded from its stored format and then re-coded in a format suitable for the recipient station. In a preferred embodiment, the recipient station may be a mobile device such as a mobile cellular telephone. The analysis also allows a new file header to be created for the output video data file that includes an indication of the expected size of the output video data.

At step 603 the output data file is streamed to the recipient by receiving the encoded input video data previously located and transcoding this received encoded input video data to produce output video data. The output video data is then supplied with the file header as a stream to the receiving device. In this way, the receiving device may view the output video data as it is received as a stream and/or the receiving device may store the output video data with the file header as a downloaded file.

At step 604 a question is asked as to whether another file is to be transcoded resulting in the next file being located at step 601. Consequently, the process stops if no further files are to be located.

FIG. 7

Figure 7:
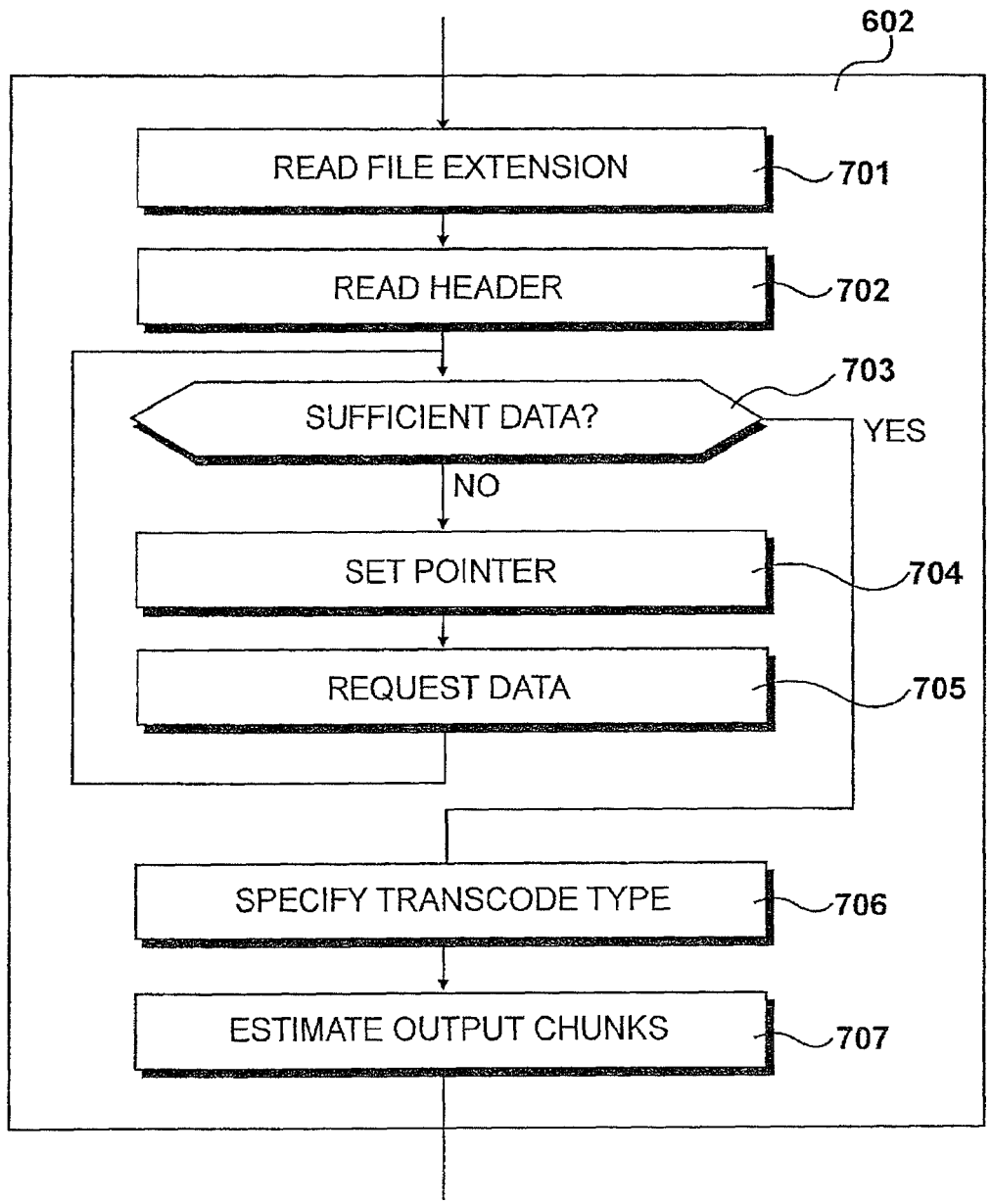
FIG. 7 shows procedures for analysing an input video data file as identified in FIG. 6.

Procedures for analysing an input video data file are detailed in FIG. 7. Having located the file, at step 701 the file extension is read. Thereafter at step 702 an attempt is made to read the file header. Thus, if a header is present at the start of a file, this information is read and retained at step 702. However, it is appreciated that some files may not have a header at the start of the file, although the relevant information may be present elsewhere within the file.

At step 703 a question is asked as to whether sufficient data has been obtained from the reading steps 701 and 702. If this question is answered in the negative, further information is obtained from the file data by using binary offsets to obtain data from different sections of the file where relevant data may be available so as to obtain the necessary information about the transcoding process. Thus, for example, it is possible to issue instructions to servers to the effect that 50 bytes say are required from a specific location within the file. Thus, a pointer is set at step 704 and the request for data is made at step 705. This results in data being returned so that the question at step 703 may be asked again. If sufficient data is still not present, the pointer may be incremented at 704 and a further request made so as to receive more data in a process that continues until the question asked at step 703 has been satisfied.

Thus, when the question asked at step 703 is answered in the affirmative, sufficient data is available for the transcoding operation to be performed. Thus, at step 706 the transcoding type is specified and at step 707 an estimate is made of the number of data chunks that will be present in the transcoded output file.

In a preferred embodiment, step 702 seeks to read the header material by initially requesting the first few thousand bytes of the downloadable file. This should include the header (if present) such that the transcoding station 116 may identify the file type that it is to expect. In particular, the transcoder will need to obtain information about the definition of the video material, the duration of the material and the number of bytes present so that it can estimate how long it will take for the file to arrive and at what bit rate.

Useful information is obtained from the file extension and from this it should be possible to determine whether the subsequent data will contain a header which in turn identifies the types of track present within the file and the number of chunks of data making up each of these tracks. However, in older formats this information tends to be at the end of the file given that it is easier to record after the whole of the file has been considered. Under these circumstances more of the file needs to be analysed and this analysis is performed by requesting portions of the stored file by communicating with the originating server using HTTP protocols.

Having identified the type of data to be received, the transcoding station 116 identifies the necessary transcoders (at step 706) and the order in which it needs to receive the chunks of data, usually from the beginning of the file to the end of the file. The transcoding station 116 then downloads the whole file which is then transcoded as the file arrives. Thus, a first chunk of data arrives and it is passed onto the transcoding buffer. By transcoding the data on the fly and by modifying the data appropriately, it is possible for a user to see the file as quickly as possible even on a handset that does not support streaming. Under existing download conditions, download times could takes as long as two minutes with a further two minutes being required for the transcoding process.

The streaming of files that may also be stored as a downloaded file is referred to as progressive downloading and mobile devices capable of processing a stream are able to start presenting the file to a viewer after about five percent of the data has been downloaded. From the user's perspective, it appears as if the data is streaming. However, unlike true streaming protocols, the file also has a finite duration. Thus, in order for progressive download procedures to work, in that the data may be processed as a stream or as a download, it is necessary for the mobile device to know the number of chunks of data that will be received as part of the download process.

For handsets that do not support streaming, a dummy media file, such as a 3GP file, is created which may be considered as a container definition for MPEG encoded video. The transcoding station 116 starts to deliver segments of the file from the beginning to the end as if the file existed but actually the file does not exist and is being created on the fly.

The file header identifies the audio and video tracks and it is usual practice for the header to tell the receiver how many data chunks present in each track. However, at this point nothing has actually been transcoded. Based on the material that has been received, the transcoding station specifies transcoding parameters such as bit rate and colour curves and also instructs the transcoder to adjust itself to forward the specified number of data chunks. If the handset does not find the necessary number of chunks, it is likely that it will not play the file correctly. The player may produce an error to the effect that the file is corrupt. With a progressive download, the handset may start playing the chunks before all of them have arrived. However, if it does not receive the number of chunks expected, a failure could occur in that the handset may be waiting for a chunk that does not exist.

If the handset supports progressive download, it will start to play the file after approximately three seconds. It can play the file as it is being downloaded, like a stream, but with the file actually downloaded at the end.

FIG. 8

Figure 8:
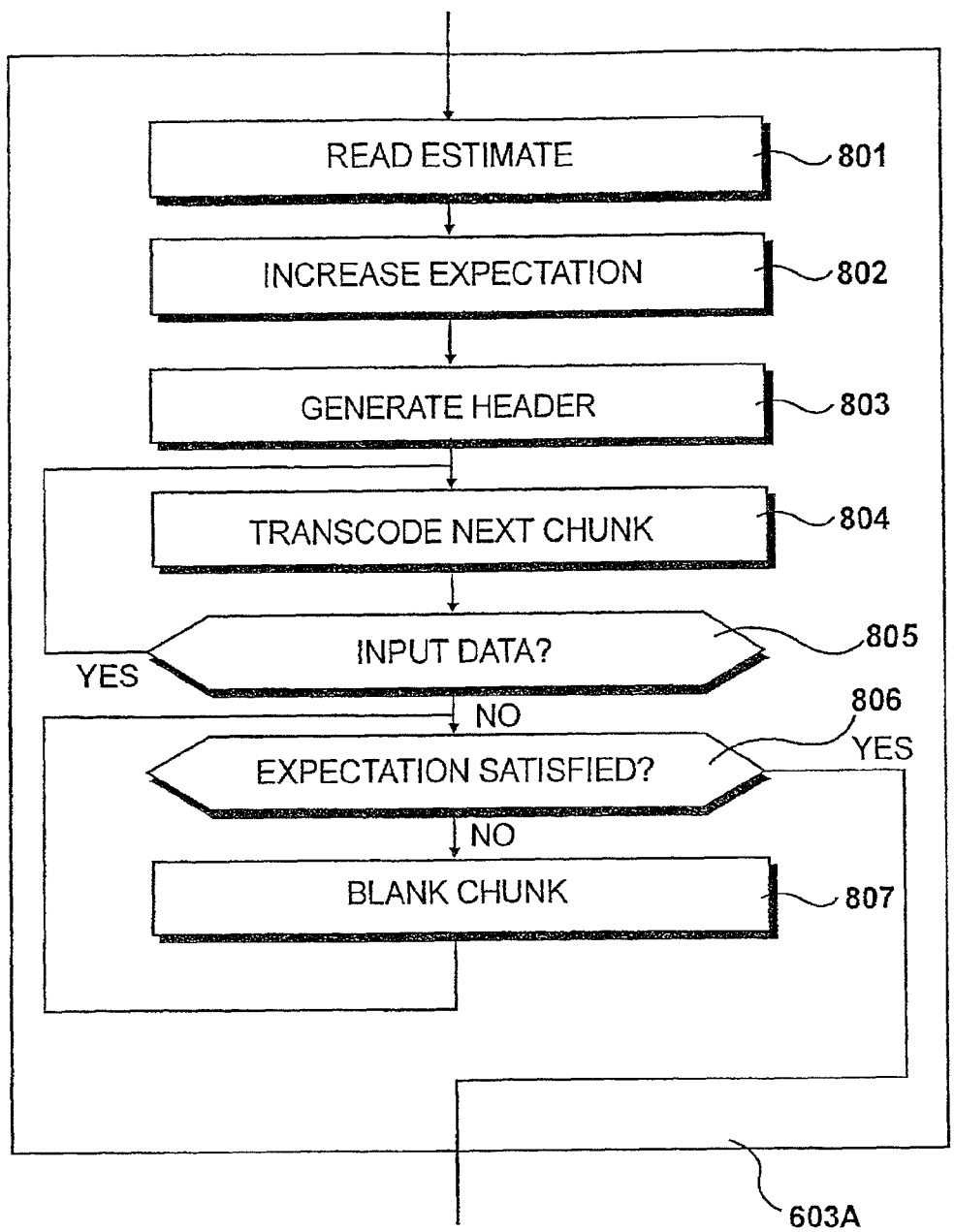
FIG. 8 shows a first embodiment for the process of streaming an output file identified in FIG. 6.
Figure 9:
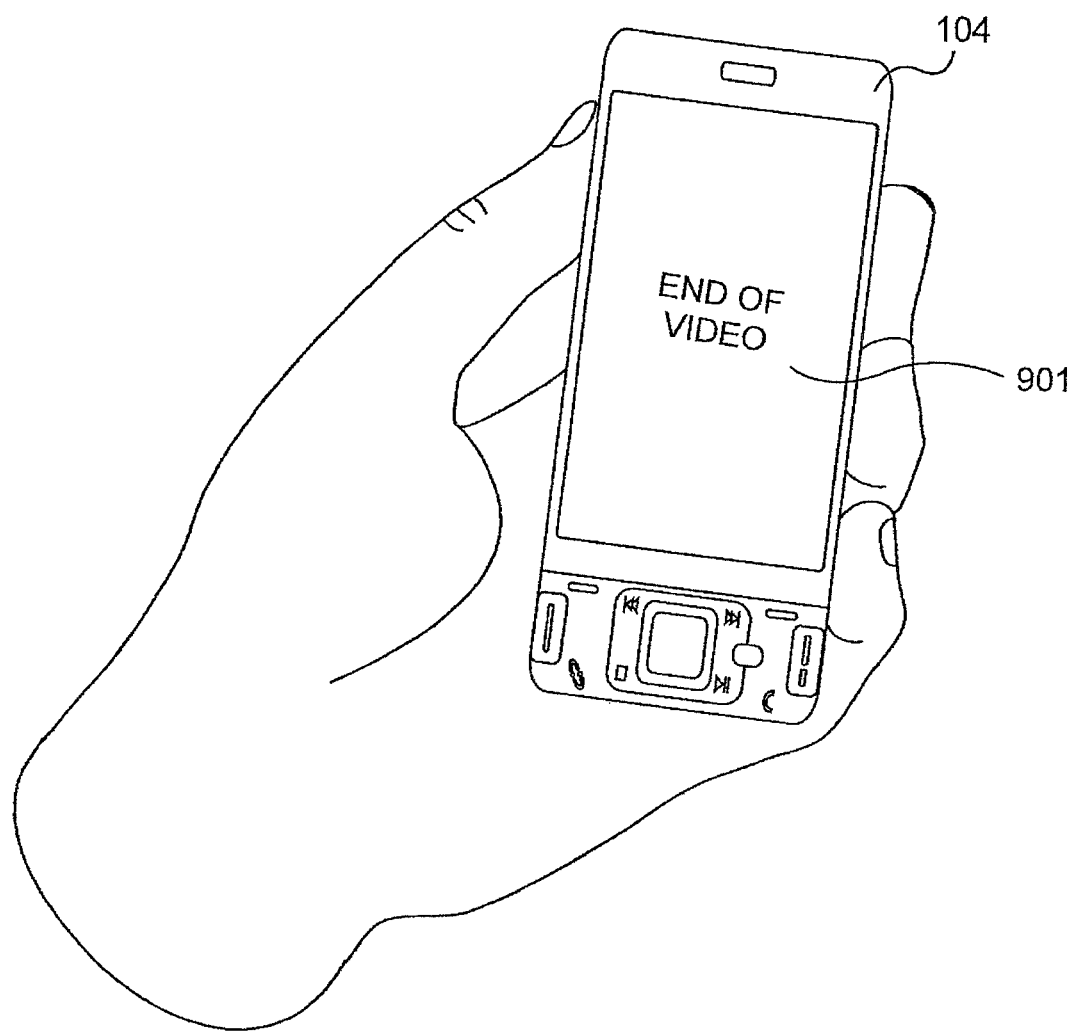
FIG. 9 illustrates a message received at a mobile device.
Figure 10:
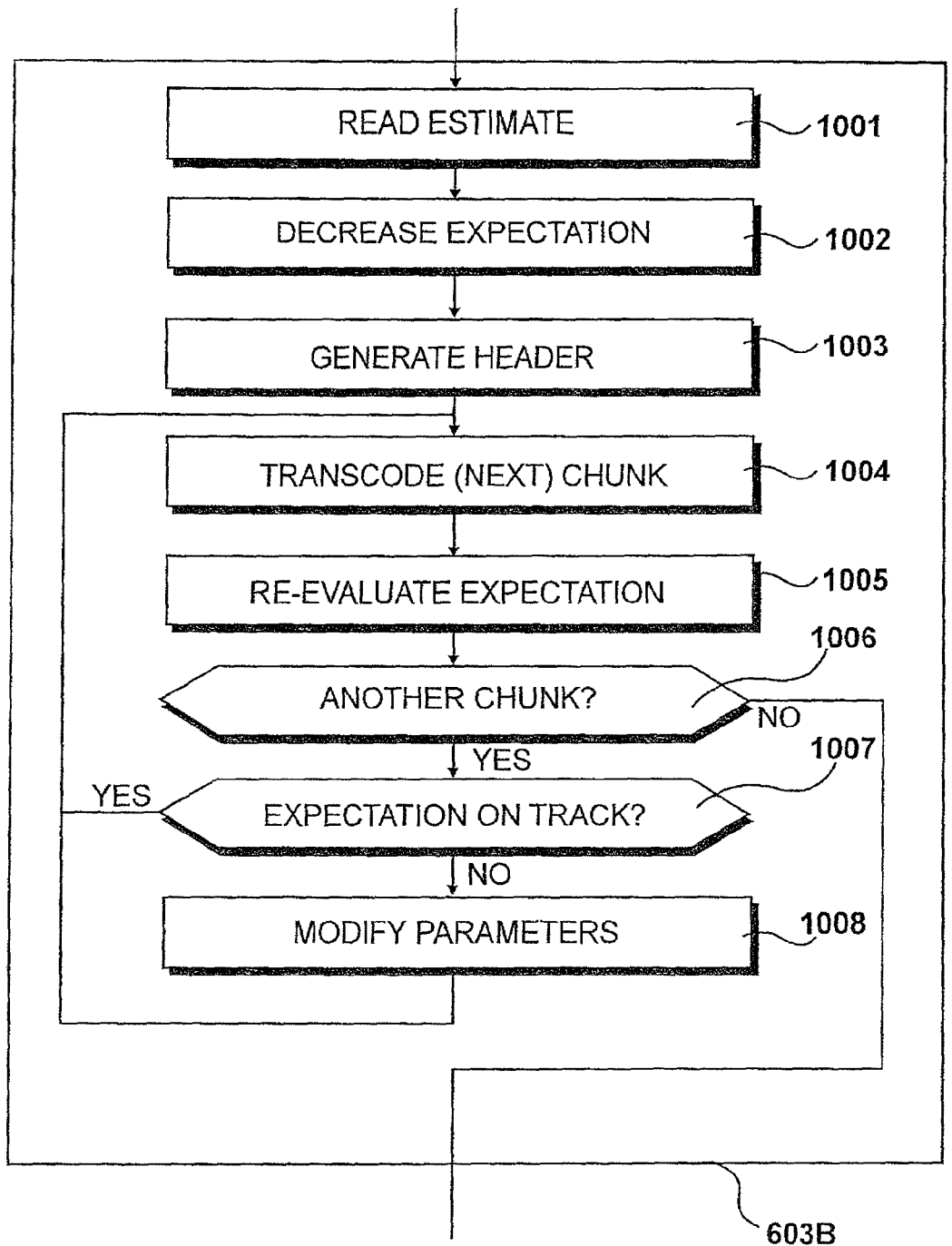
FIG. 10 shows an alternative procedure for the process of streaming the output data identified in FIG. 6.
Figure 11:
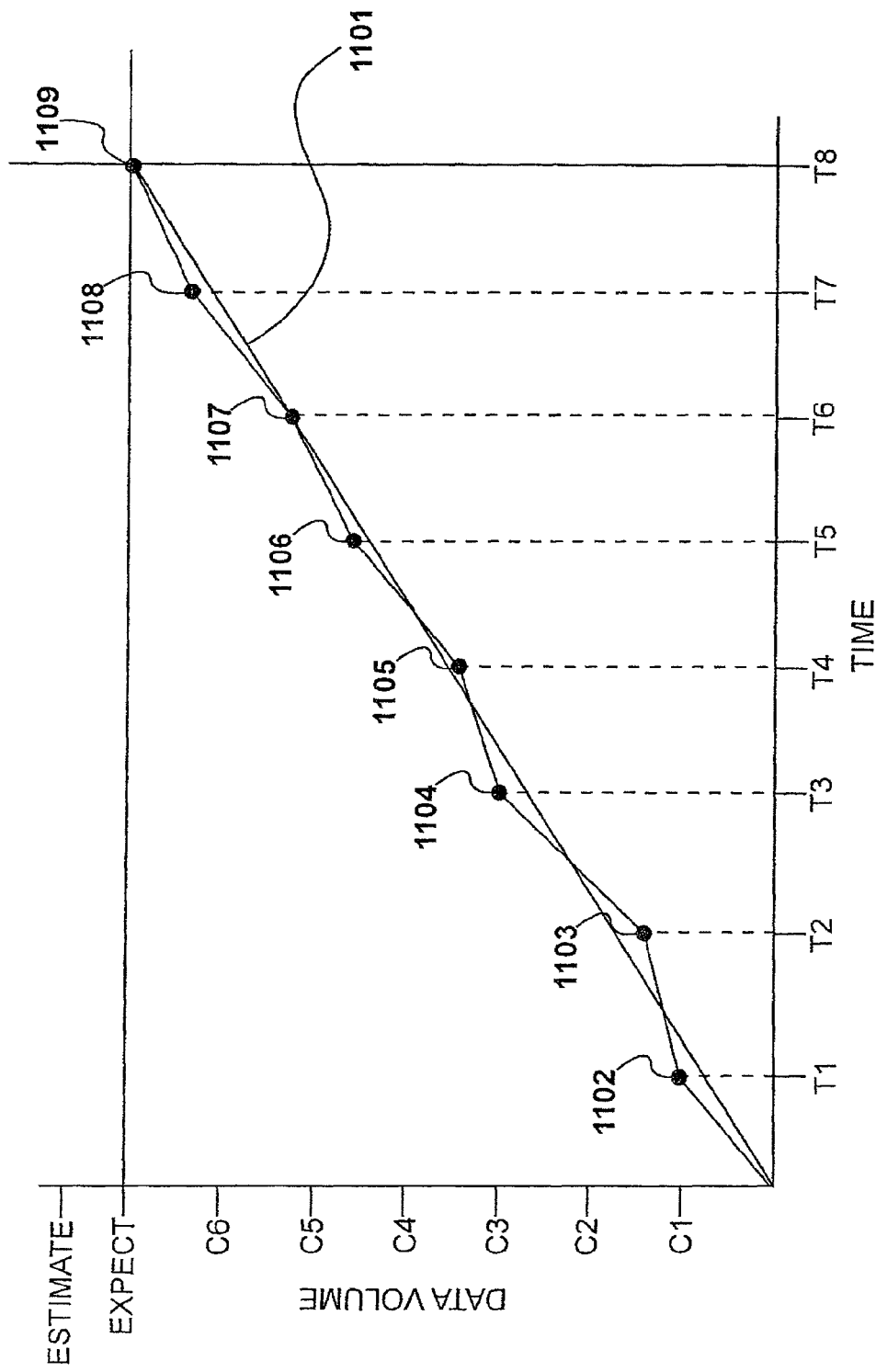
FIG. 11 illustrates the result of performing the procedures identified in FIG. 10.
Figure 12:
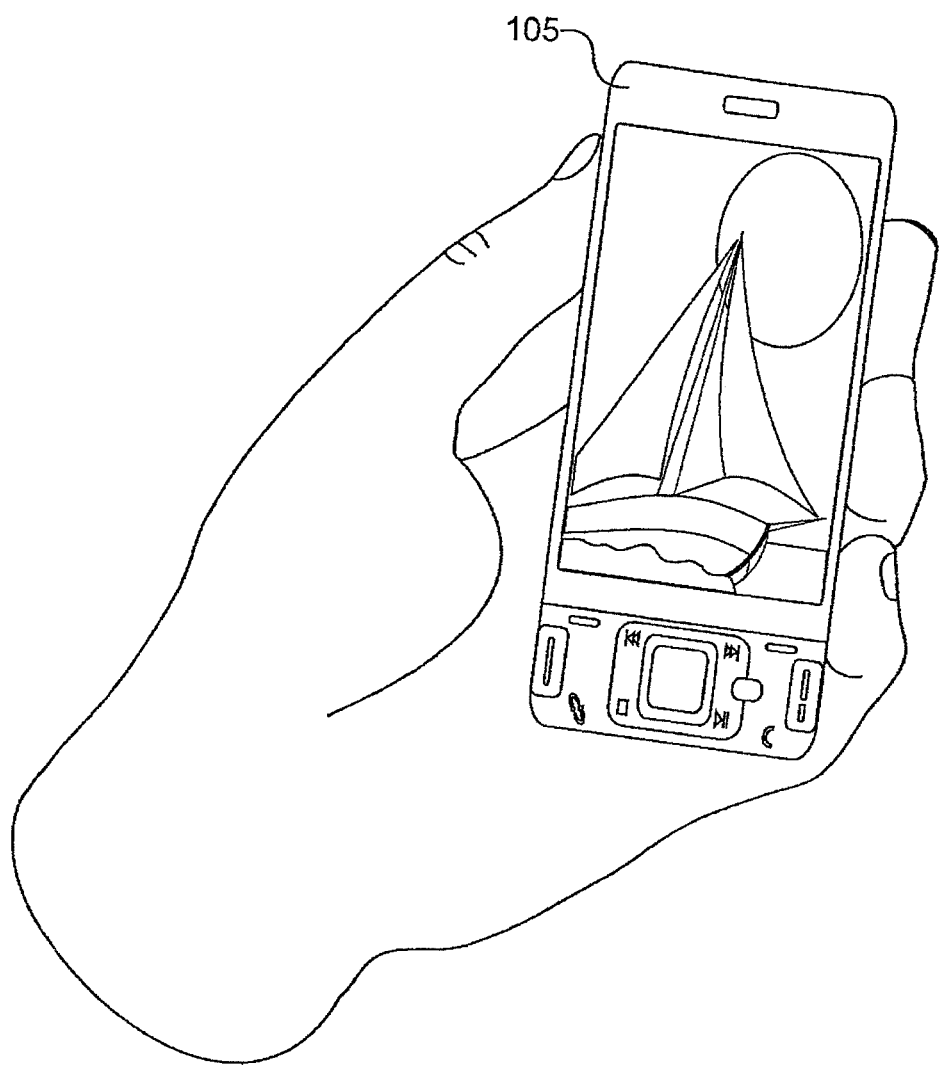
FIG. 12 illustrates video material being received at a mobile device.

Procedure 603 for streaming an output file may follow a first embodiment, as described with respect to FIGS. 8 and 9, or a second embodiment as described with respect to FIGS. 10, 11 and 12. FIG. 8 shows a first embodiment and the output streaming step 603 is identified as 603A.

At step 801 the estimate (produced at step 707) is read and the value of this estimate is increased at step 802 to produce an increased expectation. Thus, the expectation, that is to say the number of chunks expected in the transcoded file, is raised above what may be considered the best estimate.

At step 803 the header is generated which includes a definition of the number of data chunks present in the (yet to be created) file which is consistent with the expectation; that is to say it is larger than the best estimate.

At step 804 the actual transcoding process begins by taking the first chunk of the input data and transcoding this data in accordance with the transcoder type specified at step 706. This transcoded data is then sent to the receiver as if it were part of the data file following the header generated at step 803.

At step 805, a question is asked as to whether more input data is present and when answered in the affirmative the next chunk of data is transcoded at step 804.

Eventually, the question asked at step 805 will be answered in the negative, to the effect that all of the input data has been transcoded. A question is then asked at step 806 as to whether the expectation has been satisfied and if answered in the negative, to the effect that fewer chunks have been supplied to the receiver than as defined in the expectation, blank chunks are generated at step 807 until the expectation has been satisfied and the question asked at step 806 is answered in the affirmative.

FIG. 9

Mobile device 104 is shown in FIG. 9 which is a device configured for viewing streamed data but not configured to download and retain data files. For the purposes of illustration, it is assumed that video material has been supplied to device 104 and the expectation of data chunks was greater than the actual number of chunks generated. Consequently, blank chunks will have been generated at step 807 which could include a message of some sort. Thus, at the end of the video asset, a video message 901 is produced until all of the data chunks have been transmitted thereby ensuring that the totality of the transmission is consistent with the information contained in the header. Thus, as these blank chunks are being transmitted and viewed as a stream, the mobile device shows a message "end of video" until the end of the video material has been received.

FIG. 10

An alternative procedure for streaming the output data is shown in FIG. 10, identified as 603B. The method effectively performs the process identified in FIG. 5 to the effect that the data is compressed to a greater degree to achieve an expectation of data chunks that is lower than a best estimate.

At step 1001 the estimate generated at step 707 is read and at step 1002 this estimate is decreased in order to produce a decreased expectation. At step 1003 a header is generated that identifies the number of chunks present in the video file which is consistent with the expectation calculated at step 1002.

Having generated the header, the first chunk of video data is transcoded at step 1004 and after transmitting this transcoded video data, a re-evaluation is made at step 1005 concerning the expectation. Thus, having calculated a total data volume and dividing this by a number of chunks, it is possible to estimate how much data is expected within each chunk. Thus, if the calculated data per chunk is greater than the expectation per chunk, it is necessary to increase compression (and thereby reduce data volume) for the transcoding of the next chunk. Similarly, if less data is being generated than expected, the compression may be relaxed, thereby possibly generating more data for the next chunk.

At step 1006 a question is asked as to whether there is another chunk and at step 1007 a question is asked as to whether the expectation is on track. Thus, having re-evaluated the expectation at step 1005 a question is asked at step 1007 as to whether action needs to be taken.

If the question asked at step 1007 is answered in the negative, to the effect that the expectation is not on track, compression parameters are modified at step 1008. Alternatively, if the question asked at step 1007 is answered in the affirmative, it is not necessary to take any further action and control is returned to step 1004.

Thus, the transcoding progresses on a chunk by chunk basis and where appropriate, modifications are made to the compression and transcoding parameters.

FIG. 11

The result of performing the procedures of FIG. 10 upon data volumes contained within each chunk is illustrated in FIG. 11. For the purposes of illustration, it is assumed that the best estimate suggested eight chunks and this has been compressed to seven chunks as illustrated in FIG. 5.

The chunks will be transmitted over a time interval of zero to T8. The initial estimate suggested eight chunks and this has been reduced to an expectation of seven chunks. The duration over which the video is transmitted is fixed to a large extent due to the transmission bandwidth. If all chunks have the same volume of data, the transmission of seven chunks up to the expectation over time period zero to T8 will follow a straight line from 1101.

For the purposes of illustration it is assumed that the first chunk of output data produced a higher than expected data volume, such that at time T1 the data volume is above the line, as shown by point 1102. Consequently, the question asked at step 1007 will be answered in the negative and the modification of compression parameters will take place at step 1008. This results in a higher level of compression being deployed for the next transcoded chunk and as a result of this, the data volume for the second chunk is reduced such that at point 1103 the totality of the data transmitted is now below the expectation. Again, this will result in further modification taking place at step 1008 and, for the purposes of illustration, it is assumed that the data volume on the third chunk is now too high such that point 1104 is above line 1101.

Again, modification to parameters takes place and on this occasion point 1105 is below line 1101. Again, compression is relaxed resulting in point 1106 being slightly above line 1101. Further compression is deployed for the next chunk and in this example point 1107 lies on lie 1101. On this occasion, the question asked at step 1007 would be answered in the affirmative and no modifications to compression parameters are made. However, the next point 1108 is above the line resulting in modifications being made such that the expectation is satisfied by point 1109.

FIG. 12

Receiving device 105 is illustrated in FIG. 12. This device may receive downloaded files and replay these downloaded files but it does not include procedures for streaming or for reading progressive downloads as the material is received. However, according to the present embodiment, the material will be downloaded to device 105 as soon as possible such that the file is effectively being generated on the fly.

In order for the file to play correctly, the number of chunks present in the downloaded file must be consistent with the number of chunks identified in the file header. In this example, this has been achieved by tracking the amount of data produced against an expectation on a chunk by chunk basis and making modifications to compression parameters, so as to maintain consistency between the actual data downloaded and the defined expectation. Consequently, as shown in FIG. 12, the file plays and it is not necessary to add material, as was the case in the previous embodiment as shown in FIG. 9. Similarly, with a suitably configured device, such as device 113, the material could be viewed while streaming as a progressive download in addition to being replayed from local storage.

In conclusion, the system looks at the file on the Internet and makes an assessment as to how many chunks of video and audio are present after the transcoding operation has been performed. After transcoding, these numbers are available. However, if the file has not been received and therefore not transcoded, the information is not available and it is only possible to guess how much data is present.

In order to generate the progressive download on the fly, a guess is made that is as accurate as possible, identified herein as a best estimate. Tweaks are then made to ensure that the file is compliant. Thus, in a first embodiment it is possible to over estimate and then fill in with blanks. In an alternative embodiment, an estimate is made and then adjustments are made during the transcoding operation. Thus, where appropriate, quality is decreased during a transcoding process in order to ensure that the number of chunks delivered is consistent with the expectation defined in the header.

The invention claimed is:

1. A method of transcoding encoded input video data to produce encoded output video data, comprising the steps of:
    locating an input video data file;
    analysing a portion of said input video data file to determine coding characteristics of encoded input video data contained within said input video data file;
    estimating the amount of data that would be present in an output video data file created by transcoding said input video data file to generate an estimated data volume;
    modifying said estimated data volume to produce an expected number of data chunks, wherein a data chunk is a sequence of consecutive frames selected from the group consisting of image frames and audio frames and the number of frames in a data chunk is zero or greater, such that said expected number of data chunks is dependent upon the size of said input video data file;
    creating a file header for an output video data file, said header including said expected number of data chunks;
    receiving the encoded input video data located by said locating step;
    transcoding received encoded input video data to produce encoded output video data;
    during said transcoding step, supplying chunks of said encoded output video data with said file header as a stream to a receiving device; and
    monitoring the volume of output data being produced;
    in response to said monitoring, modifying the remaining output data during the transcoding operation to ensure the output data contains precisely said expected number of data chunks;
    such that said receiving device is adapted to at least one of:
    view the output video data as it is received as a stream and
    store the output video data with the file header as a downloaded file.

2. The method of claim 1, wherein said step of locating an input video data file includes being notified of an internet location from a receiver and locating said input video data file at the location notified by the receiver.

3. The method of claim 1, wherein said analysing step includes analysing a filename extension of the input video data file.

4. The method of claim 1, wherein said analysing step includes analysing a file header.

5. The method of claim 1, wherein said analysing step includes analysing portions of data contained within a body of the file.

6. The method of claim 1, wherein said step of creating a file header includes creating an indication of the number of tracks present in the output video data.

7. The method of claim 1, wherein said transcoding step transcodes input video data that has been configured for streaming to fixed location devices.

8. The method of claim 1, wherein said transcoding step transcodes said input video data for at least one of:
    streaming to mobile devices and
    downloading to mobile devices.

9. The method of claim 1, wherein said expected number of data chunks is made lower than a best estimate of the expected data volume and the data volume of the output data is reduced during the transcoding operation to make the output number of data chunks fit the expected number of data chunks.

10. The method of claim 9, wherein the data volume of the output data is reduced by increasing data compression during a re-coding operation that forms part of the transcoding step.

11. The method of claim 1, wherein the expected number of data chunks is made higher than a best estimate and redundant data are created at the end of the encoded output video data.

12. The method as claimed in claim 11, wherein said redundant data includes one of:
    blank data and
    data conveying a message.

13. An apparatus for transcoding encoded input video data to produce encoded output video data, comprising:
    a locator for locating an input video data file;
    an analyser for analysing a portion of said input video data file to determine coding characteristics of encoded input video data contained within said input video data file, and for estimating the amount of data that would be present in an output video data file created by transcoding said input video data file to generate an estimated data volume, and for modifying said estimated data volume to produce an expected number of data chunks, wherein a data chunk is a sequence of consecutive image frames or audio frames and the number of frames in a data chunk is zero or greater, such that said expected number of data chunks is dependent upon the size of said input video data file;
    a generator for generating a file header for an output video data file that includes an indication of said expected number of data chunks;
    an input interface for receiving the input video data located by said locator;
    a transcoder for transcoding the input video data to produce encoded output video data;
    a monitoring device for monitoring the volume of output video data supplied as a stream to the receiving device; and an output interface for supplying the encoded output video data with said file header as a stream to a receiving device;

wherein said transcoder modifies the remaining output data in response to data received from said monitoring device, to ensure that the output data contains precisely said expected number of data chunks;

such that said receiving device is adapted to at least one of:
view the output video data as it is received as a stream and
store the output video data with the file header as a downloaded file.

14. The apparatus of claim 13, wherein the indication of the expected number of data chunks produced by the generator is made larger than a best estimate of output number of data chunks and said transcoder produces additional output video data to ensure consistency.

15. The apparatus of claim 13, wherein the indication of the expected number of data chunks is made smaller than a best estimate and the transcoder controls data compression in response to an output from said monitoring device to ensure consistency.

16. A non-transitory computer-readable medium having computer-readable instructions executable by a computer such that when executing said instructions a computer will perform the steps of:

locating an input video data file;

analysing a portion of said input video data file to determine coding characteristics of encoded input video data contained within said input video data file;

estimating the amount of data that would be present in an output video data file created by transcoding said input video data file to generate an estimated data volume;

modifying said estimated data volume to produce an expected number of data chunks, wherein a data chunk is a sequence of consecutive frames selected from the group consisting of image frames and audio frames and the number of frames in a data chunk is zero or greater, such that said expected number of data chunks is dependent upon the size of said input video data file;

creating a file header for an output video data file, said header including said expected number of data chunks;

receiving the encoded input video data located by said locating step;

transcoding received encoded input video data to produce encoded output video data;

during said transcoding step, supplying chunks of said encoded output video data with said file header as a stream to a receiving device; and monitoring the volume of output data being produced, and in response to said monitoring, modifying the remaining output data during the transcoding operation to ensure the output data contains precisely said expected number of data chunks;

such that said receiving device is adapted to at least one of:
view the output video data as it is received as a stream and
store the output video data with the file header as a downloaded file.

\* \* \* \* \*